United States Patent [19]

Altinbasak

[11] Patent Number: 4,913,206

[45] Date of Patent: Apr. 3, 1990

[54] ROUTER GUIDE ASSEMBLY

[76] Inventor: Ilhan Altinbasak, 41-34 Frame Pl. (Apt. 3H), Flushing, N.Y. 11355

[21] Appl. No.: 361,543

[22] Filed: Jun. 5, 1989

[51] Int. Cl.$^4$ .......................... B27M 1/00; B27C 5/10
[52] U.S. Cl. ................................. 144/371; 33/27.06; 144/134 D; 144/136 C
[58] Field of Search ............................. 33/27.04, 27.06; 144/134 R, 134 D, 136 R, 136 C, 371; 409/180, 182

[56] References Cited

U.S. PATENT DOCUMENTS

| | | | |
|---|---|---|---|
| 3,635,268 | 1/1972 | Lange | 144/136 C |
| 4,044,805 | 8/1977 | Gronholz | 144/134 D |
| 4,194,543 | 3/1980 | Cotton | 144/136 C |
| 4,306,598 | 12/1981 | Poet | 144/136 C |
| 4,685,496 | 8/1987 | Livick | 144/136 C |

Primary Examiner—W. Donald Bray
Attorney, Agent, or Firm—John F. Ohlandt

[57] ABSTRACT

A router guide assembly for cutting quarter circles and annular pieces from a workpiece comprising: a guide frame comprising a first locking means, a first arm and a second arm, the first arm positioned at a right angle to the second arm; a guide bar adjustably connected to the guide frame by the first locking means, wherein the first locking means permits radial reciprocal movement of the guide bar; a radius bar; and means for adjustably and pivotally connecting said radius bar to the guide bar, including a second locking means for adjustably restraining said radius bar, wherein the second locking means permits both sectoral and radial movement of the radius bar; a router stand connected to the radius bar; and a first stop and a second stop attached to the guide bar for limiting the sectoral movement of the radius bar about a pivot point.

13 Claims, 6 Drawing Sheets

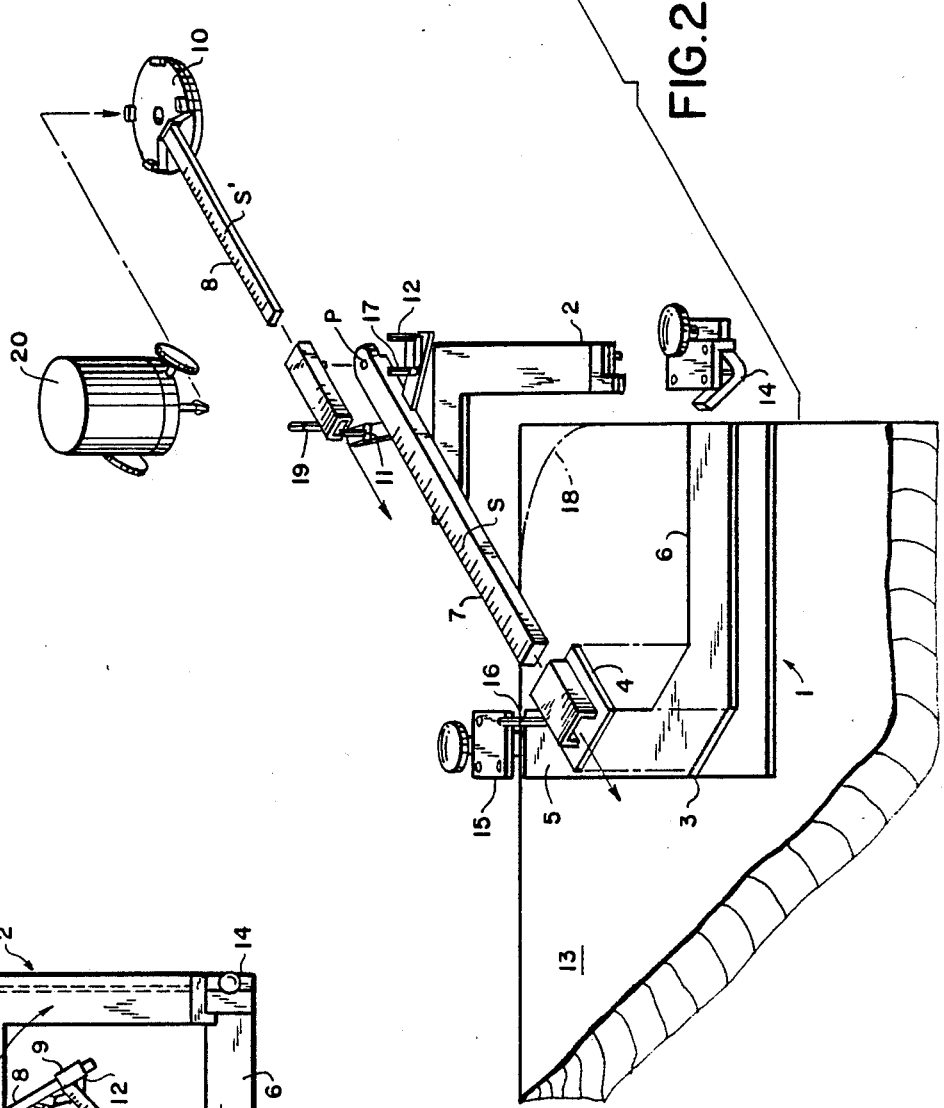
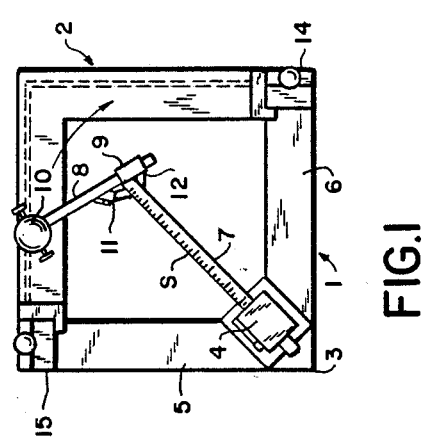

ROUTER GUIDE ASSEMBLY

BACKGROUND OF THE INVENTION

The present invention provides a novel router guide assembly which is capable of cutting quarter circles and fabricating grained annular pieces from a workpiece. The assembly is particularly suitable for rounding the corners of tabletops and forming quarter round molding.

Router machines have become a common woodworking tool used by professional cabinetmaker shops and furniture manufacturers. The movable powered router is a powerful tool capable of making edges of precise and decorative designs, as well as grooves.

Router machines are often used to cut quarter circles or fabricate quarter round molding. Assuring that each cut or molding is satisfactory requires skill and tedious preparation. To avoid errors even skilled craftsmen have found it necessary to make a template prior to cutting with a router. However, the making of a template is a tedious and costly procedure. In order to avoid the making of templates others have designed template attachments for making arcuate grooves and router guides.

One such template attachment is set forth in U.S. Pat. No. 3,716,085 (Wing), issued Feb. 13, 1973. The Wing patent discloses a router template attachment used in conjunction with a known type of router template for the purpose of providing the capability of routing arcuate pattern portions. However, this template attachment does not overcome the obstacles associated with having to prepare the template itself.

The present inventor has found it more desirable to use a router guide in place of a template attachment. Router guides have been used in the woodworking industry for many years. In particular, they have been designed to cut horizontal, vertical and arcuate patterns in cabinet doors. Various router guides are set forth in the following U.S. Pat. Nos.: 4,185,671 (Cotton), issued Jan. 29, 1980; 4,603,657 (Obradovich), issued Dec. 23, 1986; 3,841,368 (Ritter), issued Oct. 15, 1974; and 4,306,598 (Peot), issued Dec. 22, 1981.

Unfortunately, none of the aforementioned router guide devices are capable of cutting quarter circles or quarter round molding from a workpiece. U.S. Pat. No. 4,185,671 (Cotton) provides a router guide which is capable of routing arcuate designs in cabinet doors.

in the Cotton patent a router is mounted on the end of a bar which extends over the cabinet door or other panel to be routed and in which the router can be moved in any direction in a plane parallel to the panel by reason of the bar being mounted in a carrier for longitudinal movement in one dimension of the panel and the carrier being mounted for movement parallel to the other dimension of the panel. Making arcuate cuts requires the use of a radius arm which may be adjustably connected at one end to the bar and is slidably mounted in a pivot block mounted for movement in the same direction as the carriage. An adjustable stop on the radius arm limits its longitudinal movement and an adjustable stop limits movement of the pivot block whereby the router can be guided in a pre-selected curved path by causing the radius arm to pivot around the pivot block.

The router guide device disclosed in Cotton makes use of a very complicated and expensive guide apparatus, i.e., the radius arm and pivot block. Moreover, it provides a guide which is only capable of cutting slightly curved patterns and is unsuitable for use in the cutting of quarter circles or quarter round molding.

The present invention overcomes the deficiencies of the conventional router guides, since it is capable of cutting quarter circles and quarter round molding from a workpiece without the aid of templates. It is also very inexpensive to manufacture and relatively easy to install and adjust on pending workpieces. Furthermore, the present invention permits the cutting of workpieces to an angle of 90 degrees which is particularly suitable in the manufacture of tabletops and molding. Moreover, it enables adjustment of the radius involved in the cutting of quarter circles over a very wide range from one-half inch to eight inches in accordance with one embodiment.

Additional advantages of the present invention shall become apparent as described below.

SUMMARY OF THE INVENTION

A router guide assembly for cutting quarter circles and annular pieces from a workpiece comprising: a guide frame comprising a first locking means, a first arm and a second arm, the first arm positioned at a right angle to the second arm; a guide bar adjustably connected to the guide frame by the first locking means, wherein the first locking means permits longitudinal reciprocal movement of the guide bar; a radius bar adjustably and pivotally connected to the guide bar by a second locking means adjustably restraining said radius bar, wherein the second locking means permits both radial and sectoral movement of the radius bar; a router stand connected to the radius bar; and a first stop and a second stop attached to the guide bar for limiting the sectoral movement of the radius bar.

The first and second stops are attached to the guide bar so as to permit a maximum sectoral movement of 90 degrees by the radius bar. Optionally, an additional rod or pin may be disposed adjacent the first stop and the second stop, respectively, so as to avoid unwanted sectoral movement of the radius bar when the radius bar is being directed radially inwardly and outwardly in cutting an annular molding piece.

It is an additional object of the present invention to provide an economical router guide for use in making tabletops and round molding. Furthermore, the present invention includes unique methods for cutting quarter circles or fabricating annular pieces from a workpieces using this router guide assembly.

Other and further objects, advantages and features of the present invention will be understood by reference to the following specification in conjunction with the annexed drawing, wherein like parts have been given like numbers.

BRIEF DESCRIPTION OF THE DRAWINGS

FIG. 1 is a schematic view of a router guide assembly and squaring device in accordance with the present invention;

FIG. 2 is an exploded top-side perspective view of a router guide assembly and squaring device in accordance with the present invention;

DESCRIPTION OF THE PREFERRED EMBODIMENTS

Figure 3:
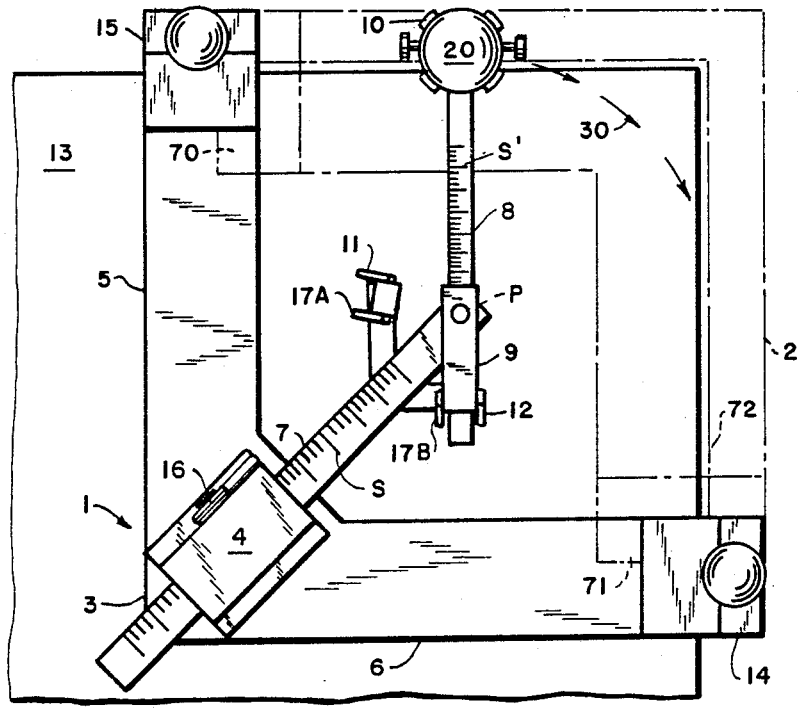
FIG. 3 is a top plan view of a router guide assembly and squaring device in accordance with the present invention.

The present invention provides a novel router guide assembly which is capable of cutting quarter circles and fabricating regular and specially grained annular pieces from a workpiece. The assembly is particularly suitable for rounding the corners of tabletops and forming quarter round annular molding.

The present invention can best be described by referring to the attached drawings. FIG. 1 is a schematic view of a router guide assembly 1 and squaring device 2. Router guide assembly 1 comprises: a guide frame 3 which includes a first locking means 4, a first arm 5 and a second arm 6; a guide bar 7 which is adjustably connected to guide frame 3 by first locking means 4; a radius bar 8 adjustably and pivotally connected to guide bar 7 by a second locking means 9 disposed on guide bar 7; a router stand 10 connected to radius bar 8; and a first stop 11 and a second stop 12 attached to guide bar 7 for controlling the sectoral movement of radius bar 8 about pivot point P. After router guide assembly 1 is squarely mounted on the workpiece, not shown, squaring device 2 is removed to permit cutting of the workpiece.

As shown in FIG. 2, guide frame 3 is mounted on a workpiece 13 and secured thereto via first clamping means 14 and second clamping means 15. Clamping means 14 and 15 are also capable of receiving male connector ends from squaring device 2, thereby assuring that router guide assembly 1 is square to workpiece 13. First locking means 4 is disposed on guide frame 3 at the intersection of first arm 5 and second arm 6. Guide bar 7 is inserted into first locking means 4 in such a manner that it is positioned at approximately 45 degree angles from arms 5 and 6. First arm 5 and second arm 6 are positioned at approximately a right angle from each other. First locking means 4 permits longitudinal or radial reciprocal movement of guide bar 7 over workpiece 13 and also locks guide bar 7 in place during the cutting procedure by means of lever 16. Such reciprocal movement of guide bar 7 establishes different locations for the pivot point P of radius bar 8, as will be explained.

First stop 11 and second stop 12 are attached to guide bar 7 in such a manner as to permit a maximum sectoral movement of 90 degrees by radius bar 8. However, it is conceivable that stops 11 and 12 could be positioned to permit larger radial movement by radius bar 8 if desired. Radius bar 8 may also be maintained in a fixed sectoral position if radial, rather than circumferential, cuts are desired. In such situation, radius bar 8 is kept stationary by activation of either first pin 17A, or second pin 17B. When radius bar 8 is swung into position between pin 17B and stop 12 (FIG. 3), and pin 17B is moved into its vertical position seen in FIG. 2, radial cuts may be made to workpiece 13. Similarly, when first pin 17A (FIG. 3), is placed into its vertical position, radial cuts 90 degrees away may be obtained on workpiece 13. However, router guide assembly 1 is typically used to cut quarter circles as depicted by circumferential cutting path 18 on workpiece 13.

Using the scale S on guide bar 7, cutting path 18 is established by first, longitudinally moving guide bar 7 to the desired position on workpiece 13. This sets pivot point P at the center of a given circle (e.g. having an 8" radius). Guide bar 7 is then locked in place by locking means 4. Using scale S, radius bar 8 is moved radially to the desired position on workpiece 13, radius bar 8 being locked in place by locking means 9. Locking means 9 is controlled by lever 19 and is pivotally connected to the end of guide bar 7 opposite locking means 4. Locking means 9 is pivotally connected to guide bar 7 by any mechanical means. Once the longitudinal positions of both guide bar 7 and radius bar 8 are selected the woodworker only has to manually push router 20, which is securely seated in router stand 10, at the end of radius bar 8, along predetermined cutting path 18. Router stand 10 is connected to radius bar 8 by any conventional mechanical means or welding. Optionally, extensions may be added to arms 5 and 6 if larger workpieces are to be cut.

Figure 4:
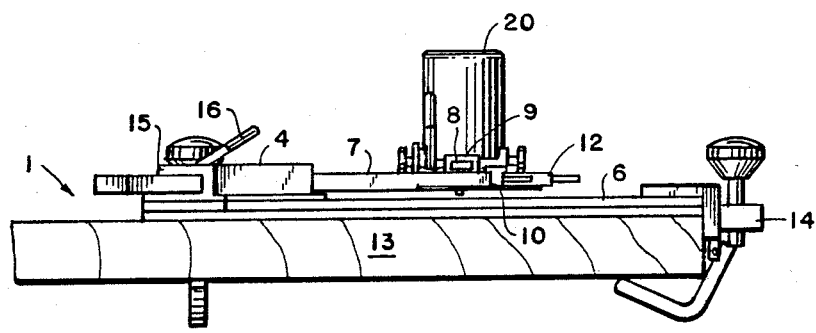
FIG. 4 is a side elevation view of the router guide assembly of FIG. 3.

FIG. 3 depicts router guide assembly 1 and squaring device 2 (in a phantom view) wherein guide bar 7 and radius bar 8 have been longitudinally positioned such that router 20 seated in router holder 10 will traverse along cutting path 30, thereby making a quarter circle cut on workpiece 13. FIG. 4 shows a side elevation view of router guide assembly 1 of FIG. 3. Clearly shown is clamping means 14 securely mounting second arm 6 to workpiece 13.

Figure 5:
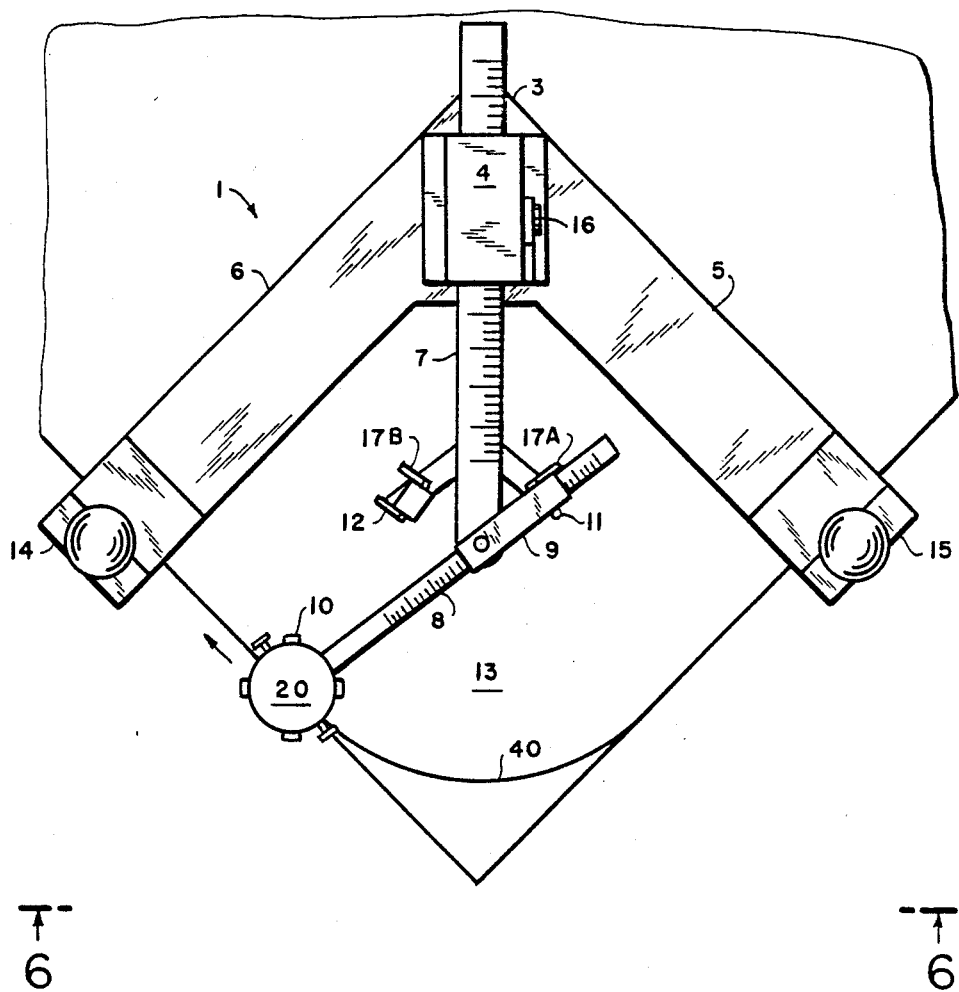
FIG. 5 is a top plan view of a router guide assembly according to the present invention making a quarter circle cut on a workpiece.
Figure 6:
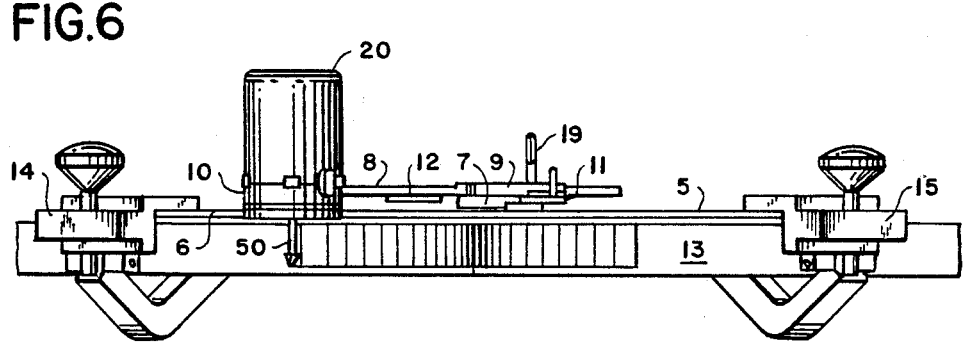
FIG. 6 is a side elevation view of the router guide assembly of FIG. 5.

FIG. 5 is a top plan view of router guide assembly 1 making a quarter circle cut on a workpiece along cutting path 40. The sectoral movement of radius bar 8 is controlled by stops 11 and 12. In order to made quarter circle cuts in workpiece 13, stops 11 and 12 are positioned so as to permit a sectoral movement of approximately 90 degrees by radius bar 8. FIG. 6 is a side elevation view of router guide assembly 1 shown in FIG. 5 and shows router drill 50 as it makes its cut on workpiece 13.

Figure 7:
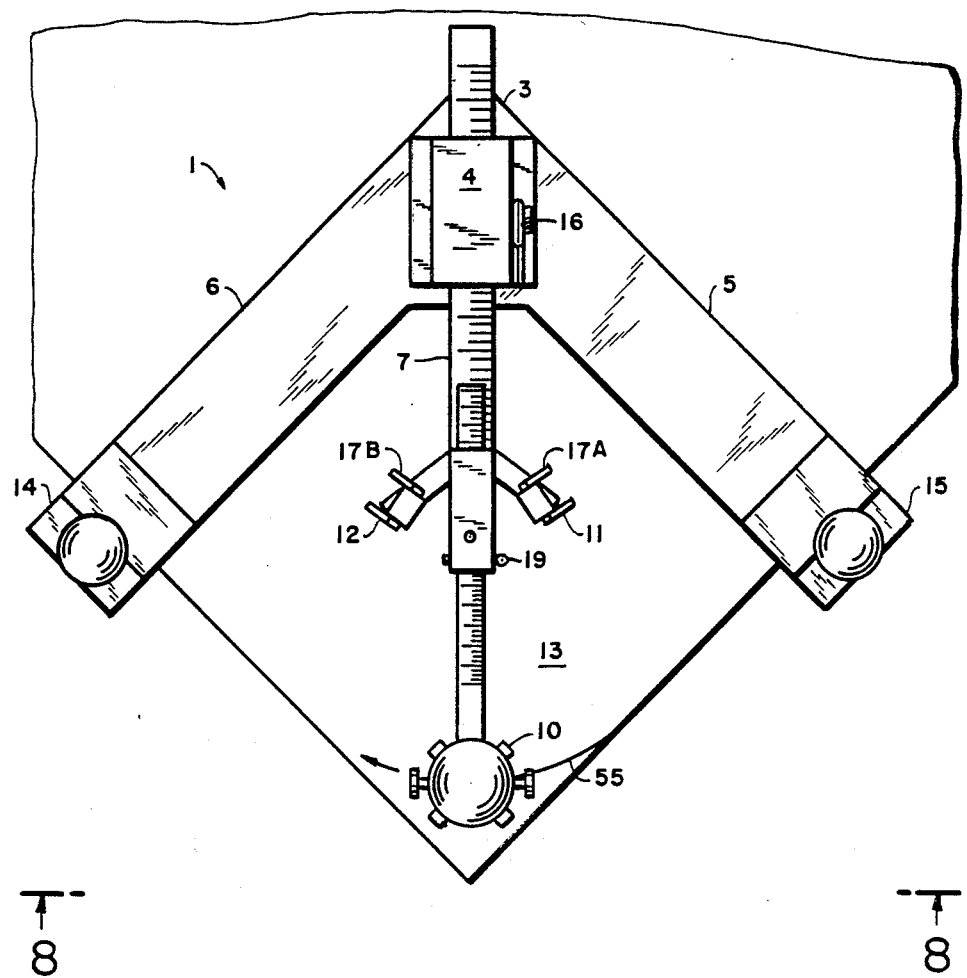
FIG. 7 is another top plan view of a router guide assembly, in accordance with the present invention, making a quarter circle cut on a workpiece, the guide assembly being in a different position from FIG. 5.
Figure 8:
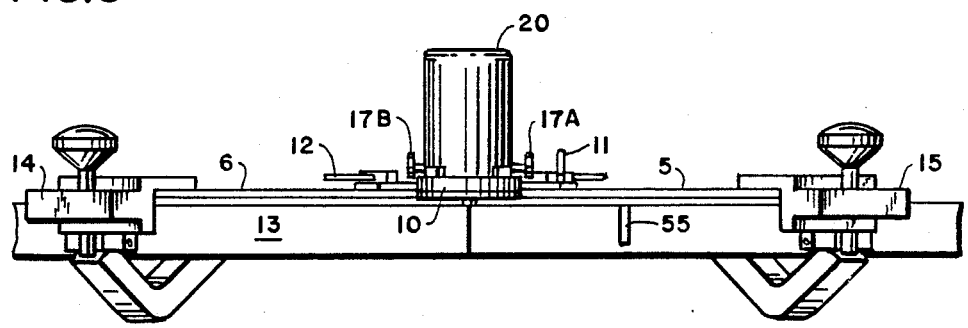
FIG. 8 is a side elevation view of the router guide assembly of FIG. 7.

FIG. 7 is a top plan view of router guide assembly 1 mid-way in making a quarter circle cut along cutting path 55 on workpiece 13. FIG. 8 shows cutting path 55 after router 20 has begun to traverse workpiece 13.

Figures 9, 10:
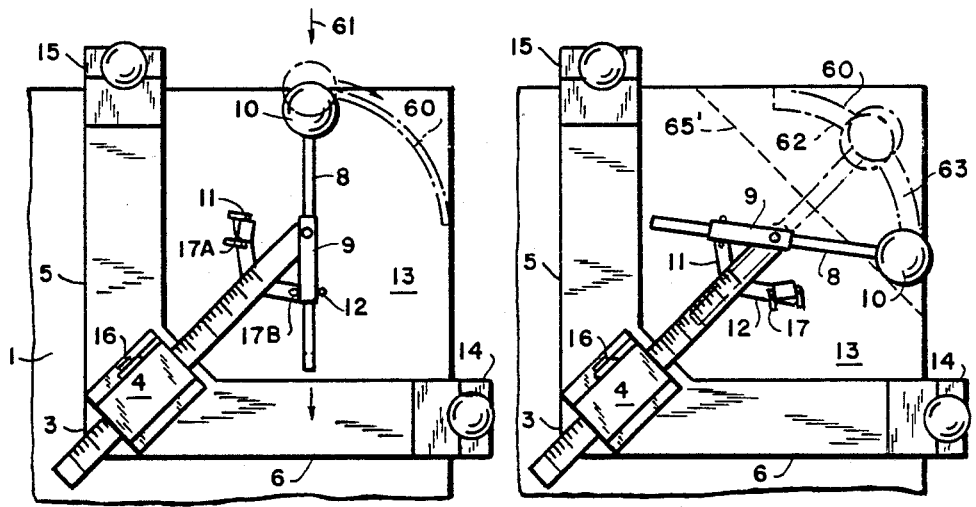
FIG. 9 is a top plan view of a router guide assembly in accordance with the present invention showing the radial reciprocal movement of the radius bar.
FIG. 10 is a top planar view of a router guide assembly in accordance with the present invention showing the radial and sectoral movement of the radius bar.
Figure 11:
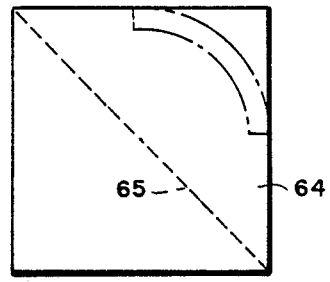
FIG. 11 is a top plan view of a specially selected piece of wood stock used to produce a desired grained annular molding element.

FIG. 9 demonstrates the radial reciprocal movement of radius bar 8. That is, after making a first cut along cutting path 60 locking means 9 is unlocked such that radius arm 8 can be moved radially in the direction of arrow 61. However, prior to radial movement, guide pin 17 must be placed in the upright position in order to maintain radius bar 8 stationary during radial cutting. Once the desired degree of radial cutting has occurred locking means 9 is returned to the locked position and guide pin 17 is lowered to permit sectoral movement of radius bar 8, hence circumferential movement of the router guide assembly, along cutting path 62, concentric with cutting path 60, as shown in FIG. 10. The radial and circumferential movement of router guide assembly 1 enables the cutting out of an annular piece 63 seen in FIG. 10. Also, this technique permits the cutting of suitably grained annular molding pieces 64 (FIG. 11) which may be fabricated from special triangular elements, such as element 64, cut on line 65, which is substituted at the upper right-hand corner of workpiece 13 in FIG. 10, being fitted along the phantom line 65'. After cutting of such an annular piece, it is used as molding in concert with straight molding pieces.

Figures 12, 13:
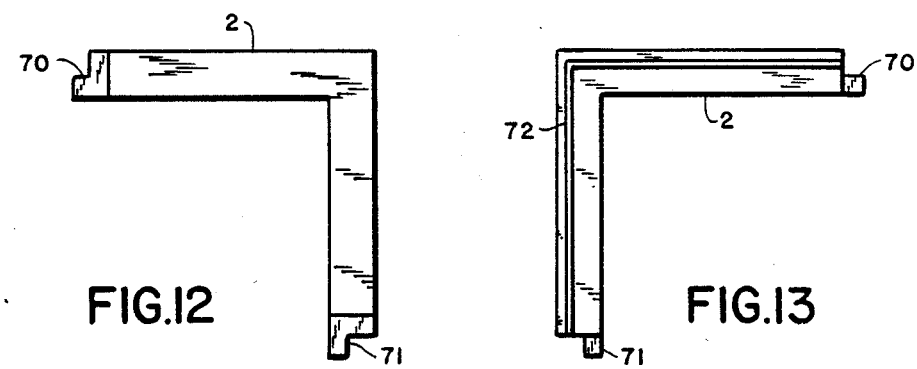
FIG. 12 is a top plan view of a squaring device used in accordance with the present invention.
FIG. 13 is a bottom plan view of the squaring device shown in FIG. 12.

FIG. 12 is a top plan view of squaring device 2 used to assure that the router guide assembly is square to the workpiece. Squaring device 2 has male connectors 70 and 71 which readily fit into female connectors of first and second clamping means, respectively. Furthermore, squaring device 2 includes a lip 72, shown in FIG. 13, on the bottom side thereof which assists in aligning it with the workpiece 13.

Figure 14:
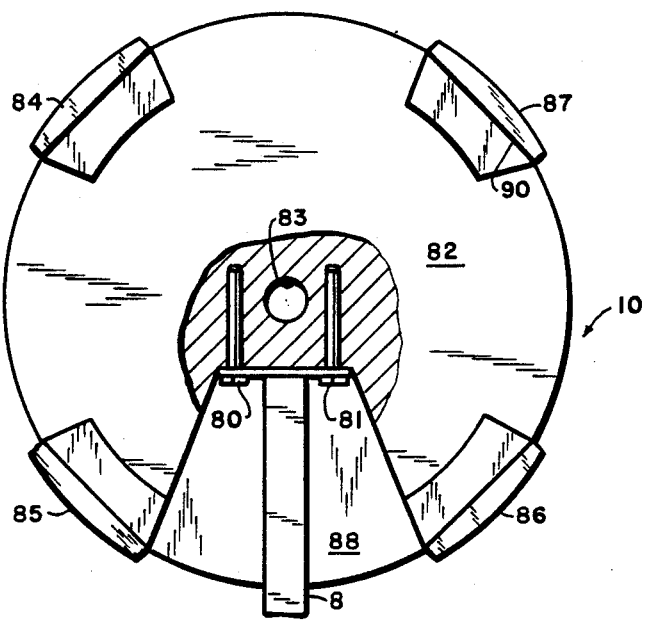
FIG. 14 is a top plan view of a router stand in accordance with the present invention.

FIG. 14 depicts router stand 10 connected to radius bar 8 via screws 80 and 81. Router stand 10 includes an upper base 82 with cut-out portion 88 capable of receiving radius bar 8, router drill bit hole 83, and guide blocks 84, 85, 86, and 87. The guide blocks act to hold the router, not shown, in place while seated on router stand 10. At least one guide block has a flat, rather than an arcuate, face 90 to prevent the router from rotating about its axis during cutting. This is accomplished by mounting a plate onto the router which has a similar base and includes a flat notched-out portion. Guide block 87 is a representational example of a flat surfaced block.

Figure 15:
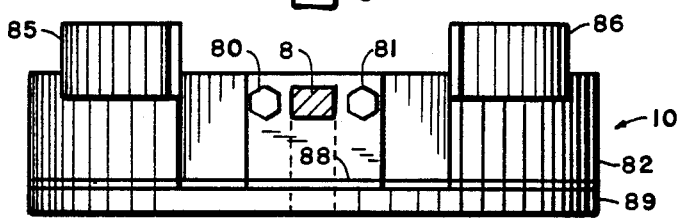
FIG. 15 is a side elevation view of the router stand shown in FIG. 14.
Figure 16:
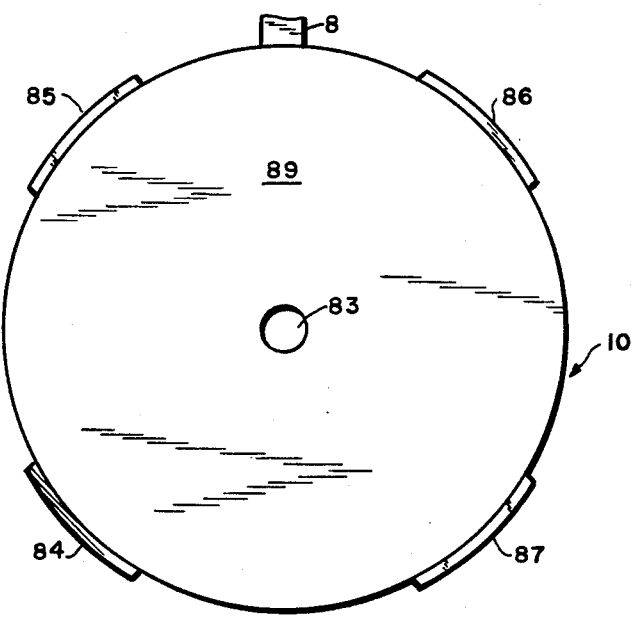
FIG. 16 is a bottom plan view of the router stand in accordance with the present invention.

FIG. 15 is a side view of router stand 10 showing upper base 82 and lower base 89. The bottom of router stand 10 is depicted in FIG. 16.

While I have shown and described several embodiments in accordance with my invention, it is to be clearly understood that the same are susceptible to numerous changes and modifications apparent to one skilled in the art. Therefore, I do not wish to be limited to the details shown and described, but intend to show all changes and modifications which come within the scope of the appended claims.

What is claimed is:

1. A router guide assembly capable of cutting quarter circles and annular pieces from a workpiece comprising:
   a guide frame comprising a first locking means, a first arm and a second arm, said first arm positioned at a right angle to said second arm;
   a guide bar adjustably connected to said guide frame by said first locking means, wherein said first locking means permits radial reciprocal movement of said guide bar;
   a radius bar; and means for adjustably and pivotally connecting said radius bar to said guide bar, including a second locking means for adjustable retaining said radius bar, wherein said second locking means permits radial movement of said radius bar;
   a router stand connected to said radius bar; and
   a first stop and a second stop attached to said guide bar for limiting the sectoral movement of said radius bar.

2. The router guide assembly according to claim 1, wherein said guide frame includes a first clamping means and a second clamping means for securely mounting said router guide assembly to said workpiece.

3. The router guide assembly according to claim 1, wherein said first locking means is disposed on said guide frame at the intersection of said first arm and said second arm in such a manner that said guide bar is positioned at 45 degree angles from both said first and second arms.

4. The router guide assembly according to claim 1, wherein said second locking means is pivotally connected to the end of said guide bar opposite said first locking means.

5. The router guide assembly according to claim 1, wherein said router stand traverses along a predetermined circumferential cutting path when said first and second locking means are in the locked position.

6. The router guide assembly according to claim 1, wherein a first locking pin and a second locking pin are disposed adjacent said first stop and said second stop, respectively, so as to restrict the sectoral movement of said radius bar.

7. The router guide assembly according to claim 6, wherein said router stand traverses along a predetermined radial cutting path when said first locking means is in the locked position, said second locking means is in the unlocked position, and said radius bar is held stationary against sectoral movement by either said first or second pin.

8. The router guide assembly according to claim 1, wherein said first and second stops are attached to said guide bar so as to permit a maximum sectoral movement of 90 degrees by said radius bar.

9. The router guide assembly according to claim 1, wherein said router stand is connected to one end of said radius bar by mechanical means or welding.

10. The router guide assembly according to claim 1, wherein said router stand comprises an upper base, a lower base, a router drill hole, and at least two router guide blocks, wherein at least one of said guide blocks has a straight flat surface thereby preventing rotation of the router about its axis during cutting.

11. The router guide assembly according to claim 1, wherein extensions may be added to said first and second arms to permit use of said router guide assembly on larger workpieces.

12. The router guide assembly according to claim 1, wherein a squaring device is connected to said guide frame to insure that said router guide assembly is square to the workpiece which the router machine is to cut.

13. A method for cutting a quarter circle from a workpiece comprising the steps of:
   squaring a router guide assembly to said work piece, said router guide assembly comprising: a guide frame comprising a first locking means, a first arm and a second arm, said first arm positioned at a right angle to said second arm; a guide bar adjustably connected to said guide frame by said first locking means, wherein said first locking means permits longitudinal reciprocal movement of said guide bar; a radius bar; means for adjustably and pivotally connecting said radius bar to said guide bar, including a second locking means for adjustably restraining said radius bar, wherein said second locking means permits radial movement of said radius bar; a router stand connected to said radius bar; and a first stop and a second stop attached to said guide bar for controlling the sectoral movement of said radius bar;

moving said guide bar to a desired longitudinal position and putting said first locking means in the locked position;

moving said radius bar to a desired radial position and putting said second locking means in the locked position; and moving said radius bar in a sectoral direction, whereby a router can make an arcuate cut along a predetermined cutting path on said workpiece.

* * * * *